United States Patent
Cheng et al.

(10) Patent No.: US 12,456,936 B2
(45) Date of Patent: Oct. 28, 2025

(54) POWER GENERATION DEVICE AND METHOD BASED ON TIME-VARYING MAGDUCTANCE PRINCIPLE

(71) Applicant: SOUTHEAST UNIVERSITY, Nanjing (CN)

(72) Inventors: Ming Cheng, Nanjing (CN); Wei Qin, Nanjing (CN); Xinkai Zhu, Nanjing (CN); Zheng Wang, Nanjing (CN); Wei Hua, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/249,533

(22) PCT Filed: Jul. 27, 2022

(86) PCT No.: PCT/CN2022/108121
§ 371 (c)(1),
(2) Date: Apr. 18, 2023

(87) PCT Pub. No.: WO2024/011662
PCT Pub. Date: Jan. 18, 2024

(65) Prior Publication Data
US 2024/0030838 A1    Jan. 25, 2024

(30) Foreign Application Priority Data
Jul. 15, 2022   (CN) .......................... 202210836863.7

(51) Int. Cl.
*H02N 11/00*   (2006.01)
(52) U.S. Cl.
CPC ................... *H02N 11/002* (2013.01)
(58) Field of Classification Search
CPC ...... H02N 11/002; H02K 53/00; H02K 35/00; H02K 21/00; H02J 7/345; H02J 2207/50
See application file for complete search history.

(56) References Cited

U.S. PATENT DOCUMENTS

| | | | | | |
|---|---|---|---|---|---|
| 3,214,614 | A | * | 10/1965 | Maeder ................. | H02K 44/26 310/11 |
| 5,293,308 | A | * | 3/1994 | Boys ..................... | H02M 5/458 324/392 |

(Continued)

FOREIGN PATENT DOCUMENTS

| CN | 1889345 A | 1/2007 |
|---|---|---|
| CN | 101425740 A | 5/2009 |

(Continued)

*Primary Examiner* — Pedro J Cuevas
(74) *Attorney, Agent, or Firm* — MUNCY, GEISSLER, OLDS & LOWE, P.C.

(57) ABSTRACT

A power generation device and method based on the time-varying magductance principle relate to the field of energy conversion, and in particular relate to an electromagnetic induction power generation device. The power generation device includes an electric energy generation unit, a power conversion unit and an electric energy storage unit. The electric energy generation unit includes a time-varying magductance component configured to form a closed conductor loop in a magnetic circuit with constant magnetic flux. By changing a magductance parameter of the time-varying magductance component, the time-varying magductance component generates induced current. The power conversion unit consists of a switching device and a circuit. The electric energy generated by the time-varying magductance component can be stored into the electric energy storage unit through controlling the switching device. The time-varying magductance power generation device provided by the present invention provides a new way for electric energy generation.

10 Claims, 4 Drawing Sheets

Time-varying magductance power generation device

(56) References Cited

U.S. PATENT DOCUMENTS

| | | | | |
|---|---|---|---|---|
| 5,341,280 A * | 8/1994 | Divan | ................... | H01F 38/14 |
| | | | | 320/109 |
| 7,830,065 B2 * | 11/2010 | Gunderson | ............ | H02K 53/00 |
| | | | | 310/267 |
| 8,050,068 B2 * | 11/2011 | Hussmann | ................ | H02J 1/08 |
| | | | | 363/21.02 |
| 11,025,153 B2 * | 6/2021 | Pureepaswong | ....... | H02K 53/00 |
| 11,998,760 B2 * | 6/2024 | Bourke, Jr. | ........... | H10F 77/147 |
| 2010/0188171 A1 * | 7/2010 | Mohajer-Iravani | ... | H01P 1/2053 |
| | | | | 333/175 |
| 2018/0048248 A1 * | 2/2018 | McAlister | .............. | H02K 53/00 |
| 2020/0028429 A1 * | 1/2020 | Pureepaswong | ..... | H02K 16/005 |
| 2022/0021290 A1 * | 1/2022 | Mills | ..................... | G21B 3/004 |
| 2022/0146076 A1 * | 5/2022 | Bourke, Jr. | .......... | A61N 5/0601 |
| 2023/0361599 A1 * | 11/2023 | Podhola | .................. | H02J 50/10 |
| 2024/0115878 A1 * | 4/2024 | Bourke, Jr. | .............. | C09J 11/02 |
| 2024/0395454 A1 * | 11/2024 | Cheng | ..................... | H01F 27/24 |
| 2025/0076349 A1 * | 3/2025 | Wang | ................... | H02M 7/537 |
| 2025/0079907 A1 * | 3/2025 | Echem | .................... | H02J 50/50 |
| 2025/0157726 A1 * | 5/2025 | Cheng | ..................... | H01F 41/04 |

FOREIGN PATENT DOCUMENTS

| | | | | |
|---|---|---|---|---|
| CN | 202260957 U | | 5/2012 | |
| CN | 111641290 A | * | 9/2020 | ............. H02K 16/02 |
| CN | 112489963 A | | 3/2021 | |
| CN | 113472083 A | | 10/2021 | |
| JP | 2003079128 A | | 3/2003 | |
| JP | 2017135259 A | | 8/2003 | |
| WO | WO-2025054958 A1 | * | 3/2025 | ............. H02K 35/02 |

\* cited by examiner (a)

(b)

POWER GENERATION DEVICE AND METHOD BASED ON TIME-VARYING MAGDUCTANCE PRINCIPLE

TECHNICAL FIELD

The present invention belongs to the technical field of energy conversion, and in particular relates to an electromagnetic induction power generation device.

BACKGROUND

The classical Faraday's law of electromagnetic induction states that when a varying magnetic field is occurred in a closed conductor coil, an induced current is generated. This is one of the main ways to generate electricity.

Referring to "PHYSICS" written by Professor Ma Wenwei and "FUNDAMENTALS OF APPLIED ELECTROMAGNETICS (Seventh Edition)" written by Professor Fawwaz T. Ulaby and Umberto Ravaioli, there are two kinds of electromotive force according to the generation mechanism of electromotive force. That is, the electromotive force caused by the change of magnetic flux density is called the induced electromotive force, and the electromotive force caused by the change of area enclosed by the closed conductor coil or the change of area orientation is called the motional electromotive force. It can be seen from the definition of the magnetic flux that the above two kinds of electromotive forces are generated by the change of magnetic flux. That is, when the magnetic flux through the area enclosed by a closed conductor loop changes, the loop may generate an induced current.

However, the problem of how to form induced current in the closed conductor loop to store electric energy under the condition of constant magnetic flux has never been addressed.

SUMMARY

The technical problem to be solved by the present invention is that, aiming at the technical defects in the background, the present invention provides a power generation device based on a time-varying magductance principle. According to the newly proposed magductance principle, when the magnetic flux of the magnetic circuit keeps constant, the time-varying magductance component can generate an induced current by changing the magductance parameter of the time-varying magductance component, further forming a time-varying magductance power generation device.

In order to solve the above technical problems, the present invention adopts the following technical solutions:

First, the present invention provides a power generation device based on the time-varying magductance principle, including an electric energy generation unit, a power conversion unit and an electric energy storage unit, where the electric energy generation unit includes a time-varying magductance component configured to form a closed conductor loop in a magnetic circuit and the magnetic circuit with a constant magnetic flux, and the time-varying magductance component will generate an induced current by changing the magductance parameter of the time-varying magductance component; and the power conversion unit includes a switching device and a circuit required for electric energy transmission; the electric energy generated by the time-varying magductance component is stored into the electric energy storage unit through the switching of the switching device of the power conversion unit.

Further, according to the power generation device based on the time-varying magductance principle provided by the present invention, the time-varying magductance component consists of a multi-turn closed coil.

Further, according to the power generation device based on the time-varying magductance principle provided by the present invention, by changing the physical environment for the time-varying magductance component, the charge linkage in the time-varying magductance component will change, resulting that the magductance parameter of the time-varying magductance component further changes over time to generate magnetomotive force, namely, induced current.

Further, according to the power generation device based on the time-varying magductance principle provided by the present invention, the time-varying magductance component forms a charge linkage F linked with the magnetic circuit at the magnetic flux $\Phi$, F=NQ, the direction of the charge linkage F and the direction of the magnetic flux $\Phi$ conform to a right-hand screw rule, N is a turn number of the closed coil, and Q is moving charges in a single-turn closed coil.

Further, according to the power generation device based on the time-varying magductance principle provided by the present invention, the magductance parameter/of the time-varying magductance component depends on the ratio of the charge linkage F linked with the magnetic circuit to the magnetic flux $\Phi$, namely, $\mathcal{L}=\Gamma/\Phi=NQ/\Phi$, and under the condition of the constant magnetic flux in the magnetic circuit, when the moving charge number Q in the time-varying magductance component is changed, the magductance parameter of the time-varying magductance component correspondingly changes to generate magnetomotive force, namely, induced current.

Further, according to the power generation device based on the time-varying magductance principle provided by the present invention, the magnetomotive force of the time-varying magductance component meets $$\mathcal{F} = N\frac{dQ}{dt} = \frac{d\Gamma}{dt} = \mathcal{L}(t)\frac{d\Phi(t)}{dt} + \frac{d\mathcal{L}(t)}{dt}\Phi(t),$$

when the magnetic flux of the magnetic circuit keeps constant and the magductance parameter of the time-varying magductance component changes over the time, namely, $\Phi \neq 0$, $d\Phi/dt=0$, $d\mathcal{L}/dt \neq 0$, and $$\mathcal{F} = \frac{d\mathcal{L}(t)}{dt}\Phi(t),$$

the time-varying magductance component generates magnetomotive force, namely, induced current, due to the variation of magductance parameter with time.

Further, according to the power generation device based on the time-varying magductance principle provided by the present invention, the power conversion unit consists of the switching devices and the circuit for electric energy transmission, where a first switch K1 connects in parallel with two ends of the closed coil in the time-varying magductance component, and a second switch K2 connects in series with two ends of the closed coil, meanwhile, the first switch K1 is normally closed and the second switch K2 is normally open. When the electric energy generated by the time-varying magductance component needs to be transferred into the electric energy storage unit to store, the power conversion unit works, at the moment, the second switch K2 is closed and the first switch K1 is open until the electric energy is completely transferred.

Further, according to the power generation device based on the time-varying magductance principle provided by the present invention, the electric energy storage unit is a supercapacitor or another device suitable for fast charging and energy storage.

The present invention further provides a power generation method based on the time-varying magductance principle, specifically including:

S1: selecting a magnetic circuit with a constant magnetic flux or a space with a constant magnetic field;

S2: placing the power generation device based on a time-varying magductance principle provided by the present invention into the magnetic circuit with constant magnetic flux or the constant magnetic field space, making the magnetic flux in the magnetic circuit link with the time-varying magductance component in the power generation device to form a charge linkage;

S3: changing the charge linkage in the time-varying magductance component, so that the magductance parameter changes over the time to generate magnetomotive force, namely, induced current; and S4: outputting the generated induced current to the electric energy storage unit by controlling the power conversion unit in the time-varying magductance power generation device, to provide electric energy for an electromagnetic device Further, according to the power generation method based on the time-varying magductance principle provided by the present invention, in step S3, under the condition that the magnetic flux in the magnetic circuit keeps constant:

by changing a physical environment for the time-varying magductance component, the charge linkage in the time-varying magductance component changes, and the magductance parameter of the time-varying magductance component further changes over time to generate magnetomotive force, namely, induced current; and by changing the moving charge number in the time-varying magductance component, the magductance parameter of the time-varying magductance component accordingly changes to generate magnetomotive force, namely, induced current.

By adopting the above technical solution, compared with the prior art, the present invention has the following beneficial effects:

1. By using the power generation device based on the time-varying magductance principle, a method of generating the magnetomotive force (induced current) under constant magnetic flux is invented, providing a new way for the electric energy generation.
2. A more comprehensive electromagnetic induction law is formed according to the magnetomotive force equation with the time-varying magductance component. The invented electromagnetic induction law not only includes the original Faraday's law of electromagnetic induction, but also includes the time-varying magductance induction law under constant magnetic flux.
3. Based on the provided time-varying magductance component, the present invention provides a method of calculating the magductance parameter of the time-varying magductance component and the magnetomotive force, and lays the theoretical basis for the engineering application of the power generation device based on the time-varying magductance principle.

DETAILED DESCRIPTION

The technical solution of the present invention will be further described in detail below in conjunction with accompanying drawings.

The present invention provides a power generation device based on the time-varying magductance principle. The core content of the present invention is that when the magnetic flux of the magnetic circuit keeps constant, the time-varying magductance component generates an induced current by changing the magductance parameter of the time-varying magductance component, further forming the time-varying magductance power generation device.

Figure 1:
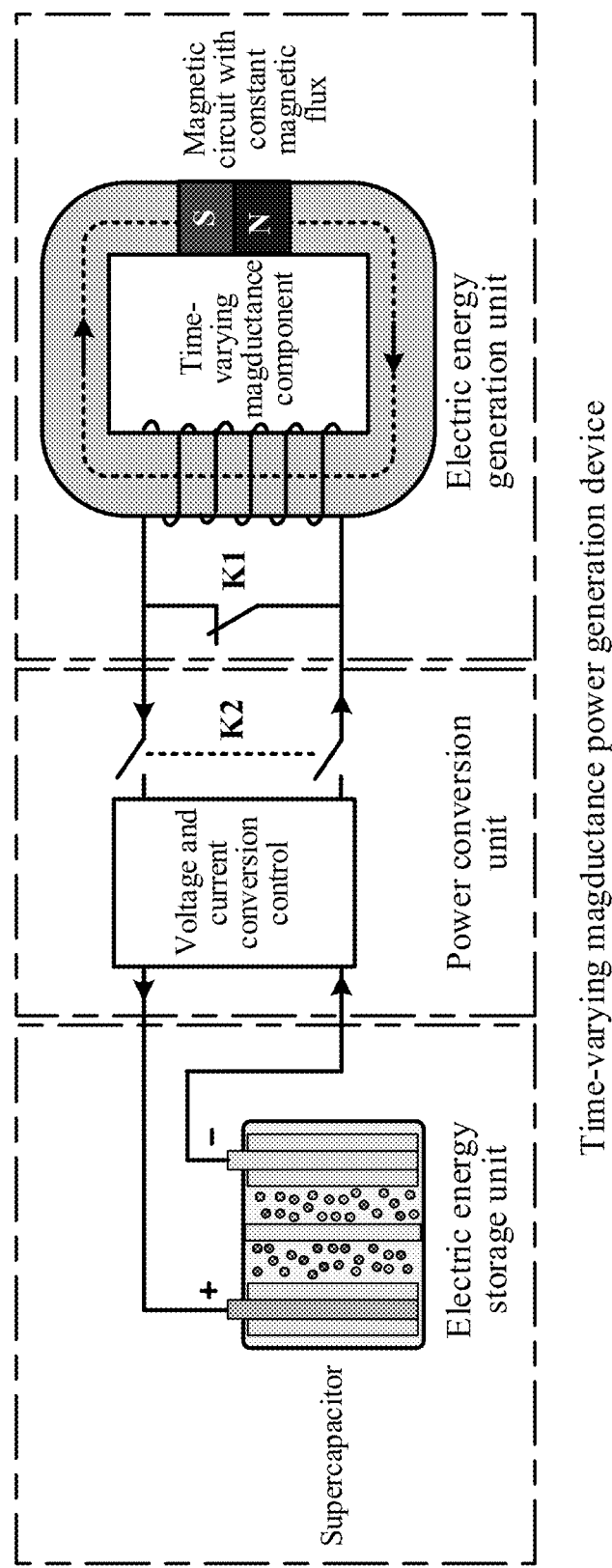
FIG. 1 is a structural schematic diagram of a power generation device based on the time-varying magductance principle of the present invention.

The time-varying magductance power generation device includes an electric energy generation unit, a power conversion unit and an electric energy storage unit, as shown in FIG. 1. The electric energy generation unit includes a time-varying magductance component configured to form a closed conductor loop in a magnetic circuit with constant magnetic flux. The electric energy generation unit may store the electric energy generated by the time-varying magductance component into the electric energy storage unit through the power conversion unit, and the stored electric energy may be used by an electromagnetic device. The power conversion unit consists of switching device and a circuit for electric energy transmission. In general, the power conversion unit enables the electric energy generation unit to be in a short-circuit state so as to form a time-varying magductance component. When the electric energy needs to be transmitted outwards, the switching device is connected with the electric energy generation unit and the electric energy storage unit, so that the generated electric energy is transmitted into the electric energy storage unit. The electric energy storage unit is a device configured to store the electric energy, such as a supercapacitor.

The time-varying magductance component is a part configured to form a closed conductor loop in the magnetic circuit. Along with the change of physical environments (temperature, humidity, brightness, illumination, and so on), the magductance parameter of the time-varying magductance component changes over the time.

Further, the time-varying magductance component may form a charge linkage linked with the magnetic circuit with the magnetic flux Φ, and the magnitude of the charge linkage F depends on the turn number N of the closed coil forming the time-varying magductance component and the moving charge number Q in a single-turn closed coil, namely, Γ=NQ. The direction of the charge linkage Γ and the direction of the magnetic flux Φ meet the right-hand screw rule.

Further, the magductance parameter $\mathcal{L}$ of the time-varying magductance component depends on a ratio of the charge linkage Γ linked with the magnetic circuit to the magnetic flux Φ, namely, $\mathcal{L}=\Gamma/\Phi=NQ/\Phi$, and the definition unit of the time-varying magductance is C/Wb or C/(V·s). Under the condition of the constant magnetic flux in the magnetic circuit, when the moving charge number Q in the time-varying magductance component is changed, the magductance parameter of the time-varying magductance component accordingly changes.

Further, the magnetomotive force of the time-varying magductance component may be expressed by $$\mathcal{F} = N\frac{dQ}{dt} = \frac{d\Gamma}{dt} = \mathcal{L}(t)\frac{d\Phi(t)}{dt} + \frac{d\mathcal{L}(t)}{dt}\Phi(t).$$

In the formula, the first item is the magnetomotive force generated through magnetic flux change of the magnetic circuit, which meets the Faraday's law of electromagnetic induction. The second item is the magnetomotive force generated through time-varying magductance, which describes a method of generating magnetomotive force (induced current) under the constant magnetic flux. The physical content described by the second item is a core mechanism of the power generation device based on the time-varying magductance principle provided by the present invention.

Further, when the magnetic flux of the magnetic circuit does not change over the time, but the magductance parameter of the time-varying magductance component changes over the time, namely, $\Phi\neq 0$, $d\Phi/dt=0$, and $d\mathcal{L}/dt\neq 0$, an expression of the magnetomotive force with the time-varying magductance component can be written as $$\mathcal{F} = \frac{d\mathcal{L}(t)}{dt}\Phi(t),$$

showing the time-varying magductance component will generate magnetomotive force (induced current) by changing magductance parameter.

Further, according to the power generation device based on the time-varying magductance principle provided by the present invention, the power conversion unit consists of the switching device and a circuit for electric energy transmission. The first switch K1 is normally closed, the second switch K2 is normally open, when the electric energy generated by the time-varying magductance component needs to be transferred into the electric energy storage unit to store, the power conversion unit works, at the moment, the switch K1 is open and the switch K2 is closed until the electric energy is completely transferred.

Further, according to the power generation device based on the time-varying magductance principle provided by the present invention, the electric energy storage unit may be a supercapacitor or any another device suitable for fast charging and energy storage.

Based on the magnetomotive force equation with the time-varying magductance, the power generation device based on the time-varying magductance principle provided by the present invention includes the following specific processes:

S1: A magnetic circuit with constant magnetic flux or a space with constant magnetic field is selected.

S2: The time-varying magductance power generation device is placed into the magnetic circuit with constant magnetic flux or the constant magnetic field space, making the magnetic flux of the magnetic circuit link with the time-varying magductance component in the time-varying magductance power generation device to form a charge linkage.

S3: The charge linkage (conductivity) in the time-varying magductance component is changed, so that the magductance parameter changes over the time.

S4: Induced current is generated in the time-varying magductance power generation device to provide electric energy for electromagnetic devices.

Figure 2:
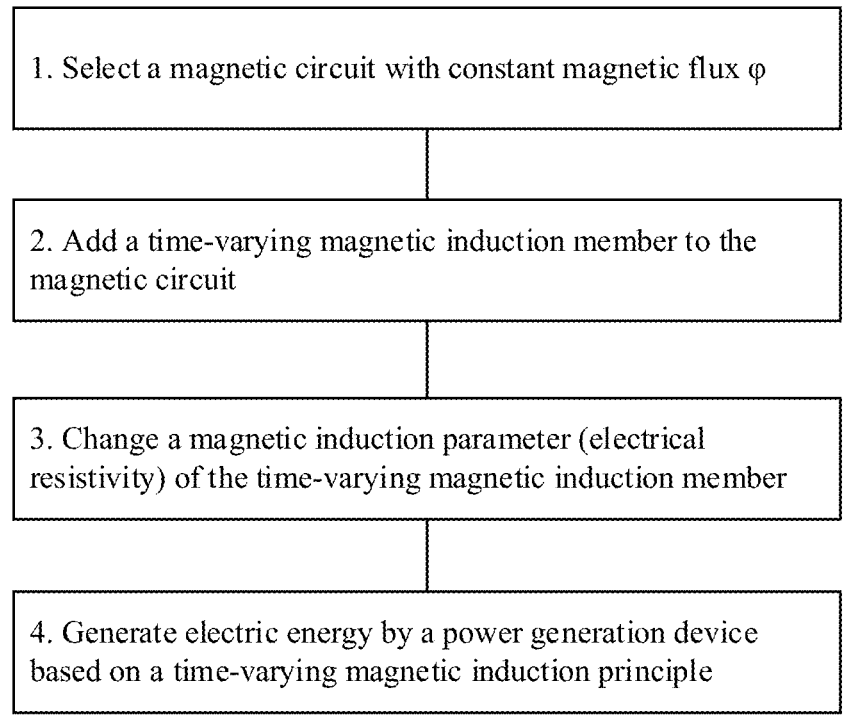
FIG. 2 is a flowchart of a power generation device based on the time-varying magductance principle of the present invention.
Figure 3:
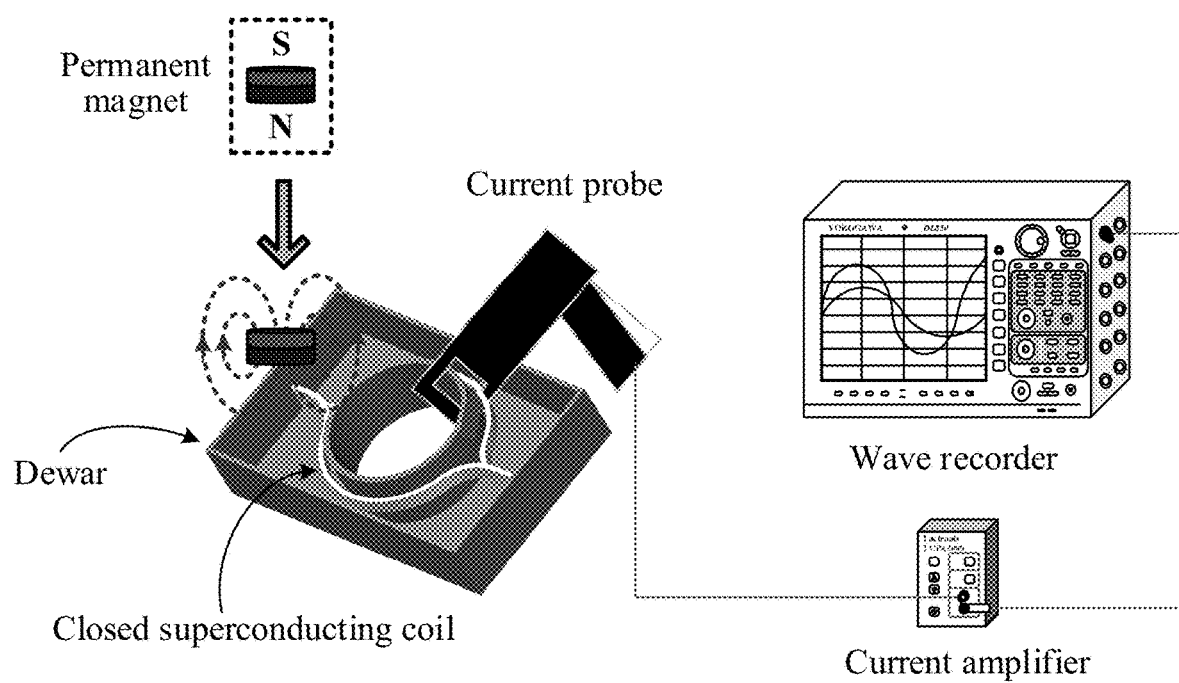
FIG. 3 is a verification device of a power generation device based on a time-varying magductance principle of the present invention.

FIG. 2 is a flowchart corresponding to the power generation device based on the time-varying magductance principle. The time-varying magductance power generation device provided by the present invention will be verified according to the flowchart hereafter. A verification device of a time-varying magductance power supply is shown in FIG. 3. The time-varying magductance component is formed by a closed superconducting coil which is disposed in a dewar and linked with a constant magnetic field formed by a permanent magnet. The closed superconducting coil is cooled through liquid nitrogen, so that the superconducting coil enters a superconducting state from a normal conducting state, or conversely, so that the magductance parameter of the time-varying magductance component is changed. The magnetomotive force (induced current) generated by the time-varying magductance component is caught and shown through a current amplifier, a current probe and an oscilloscope. The correctness of the magnetomotive force equation with the time-varying magductance and the implementability of the power generation device based on the time-varying magductance principle are verified by the verification device shown in FIG. 3.

Figure 4:
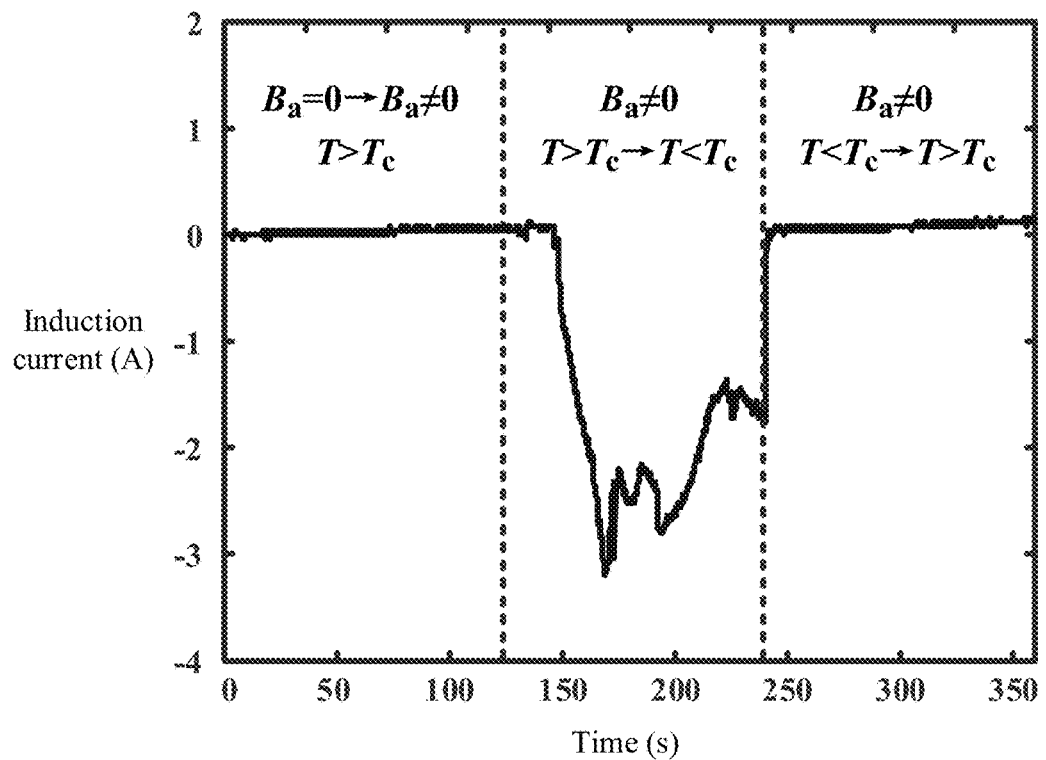
FIG. 4 is experiment results of a power generation device based on the time-varying magductance principle of the present invention.
Figure 4:
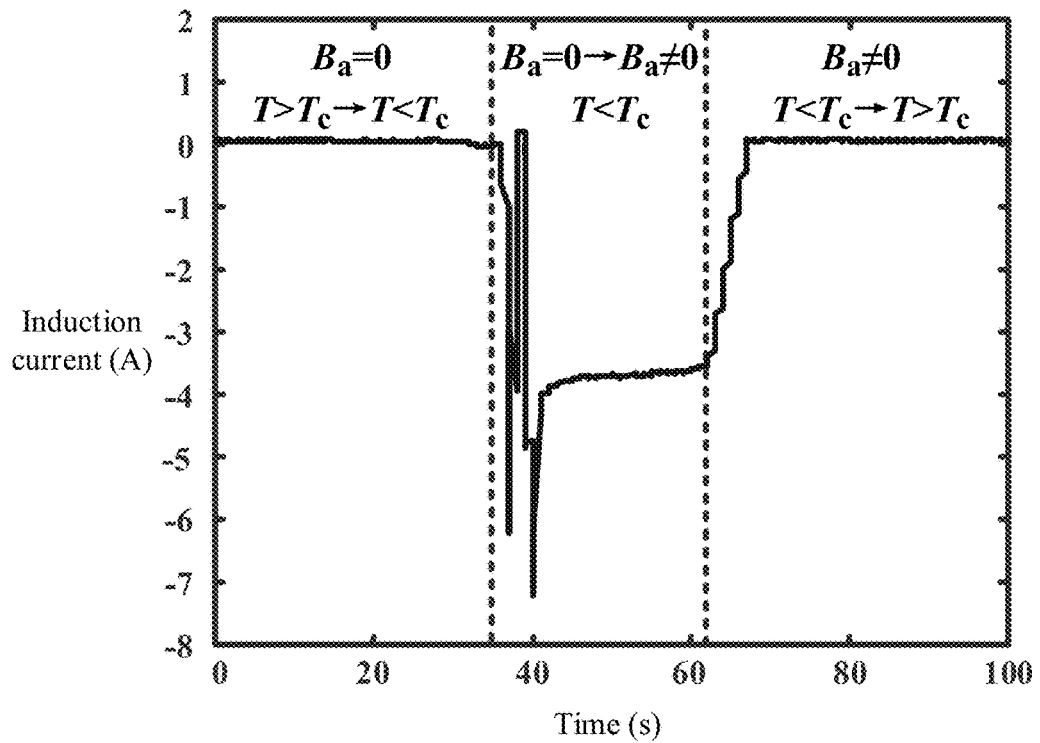

Experiment results of electric energy generation by the power generation device based on the time-varying magductance principle are shown in FIGS. 4 (a) and (b). The power generation process under constant magnetic flux is shown in FIG. 4(a). The whole process may be divided into three stages according to dotted lines in the figure. At the first stage, the permanent magnet is moved to a marked position at a room temperature, and the position of the permanent magnet is fixed. In this process, the superconductor is in a normal conducting state, the resistance is relatively large, and the magnetic field of the permanent magnet is weak, so it can be seen that the closed superconducting coil does not generates induced current in this process as shown in the waveform of the oscilloscope. At the second stage, liquid nitrogen is poured into the dewar, so that the closed superconducting coil gradually cools to enter the superconducting state. With the superconducting coil entering the superconducting state, the magductance parameter of the time-varying magductance component changes, so that the magnetomotive force (induced current) is generated, and maintains for a certain time. The occurrence of this phenomenon proves that the power generation device based on the time-varying magductance principle stands up. At the third stage, with the temperature rising again, the superconducting coil enters the normal conducting state from the superconducting state, the magductance parameter returns to a normal value, and reverse induced current is generated again, so that the current in the closed superconducting coil returns to zero.

A power generation process under the changed magnetic flux of the magnetic circuit is shown in FIG. 4(b). The whole process is also divided into three stages according to dotted lines in the figure. At the first stage, liquid nitrogen is poured into the dewar so that the closed superconducting coil be cooled to enter the superconducting state, by observing the waveform of the oscilloscope, it can be seen that the closed superconducting coil does not generates induced current in this process, which shows that the magnetomotive force (induced current) cannot be generated only be changing the magductance parameter under the condition of no magnetic field. At the second stage, the permanent magnet is moved to the marked position in the superconducting state. Since the magnetic flux changes, the induced current is generated in the closed superconducting coil, and the experiment result conforms to the Faraday's law of electromagnetic induction. At the third stage, with the temperature rising again, the superconducting coil enters the normal conducting state from the superconducting state, the magductance parameter returns to a normal value, and reverse induced current is generated. Additionally, the resistance of the closed coil in the normal conducting state is large, so that the induced current in the closed superconducting coil returns to zero. The correctness of the magnetomotive force equation with the time-varying magductance is sufficiently proved through the two groups of experiment results.

In conclusion, the present invention provides a power generation device based on the time-varying magductance principle. The above mentioned is only exemplary embodiments of the present invention, and the protection scope of the present invention is not limited to the above embodiments. The time-varying magductance component is not limited to a closed superconducting coil. Any materials configured to form the time-varying magductance component and equivalent modifications or changes made by those of ordinary skill in the art according to the content disclosed in the present invention shall all fall within the protection scope of claims.

The above mentioned is only parts of embodiments of the present invention. It should be pointed out that those of ordinary skill in the art can also make various improvements and modifications without departing from the spirit or scope of the present invention, and these improvements and modifications shall also be included within the protection scope of the present invention.

What is claimed is:

1. A power generation device based on the time-varying magductance principle, consists of an electric energy generation unit, a power conversion unit and an electric energy storage unit, wherein
   the electric energy generation unit comprises a time-varying magductance component configured to form a closed conductor loop in a magnetic circuit with constant magnetic flux, and the time-varying magductance component generates an induced current by changing the magductance parameter of the time-varying magductance component; and
   the power conversion unit comprises switching device and a circuit for electric energy transmission; and the electric energy generated by the time-varying magductance component is stored into the electric energy storage unit through controlling the switching device of the power conversion unit.

2. The power generation device based on the time-varying magductance principle according to claim 1, wherein the time-varying magductance component consists of a multi-turn closed coil.

3. The power generation device based on the time-varying magductance principle according to claim 2, wherein a physical environment is changed for the time-varying magductance component, the charge linkage in the time-varying magductance component will change, resulting that the magductance parameter of the time-varying magductance component correspondingly changes over time to generate magnetomotive force, namely, induced current.

4. The power generation device based on the time-varying magductance principle according to claim 2, wherein the time-varying magductance component forms a charge linkage $\Gamma$ linked with the magnetic circuit with the magnetic flux $\Phi$, $\Gamma=NQ$, the direction of the charge linkage $\Gamma$ and the direction of the magnetic flux $\Phi$ conforms to the right-hand screw rule, N is turn number of the closed coil, and Q is moving charges in a single-turn closed coil.

5. The power generation device based on the time-varying magductance principle according to claim 4, wherein the magductance parameter L of the time-varying magductance component depends on a ratio of the charge linkage $\Gamma$ linked with the magnetic circuit to the magnetic flux $\Phi$, namely, $L=\Gamma/\Phi=NQ/\Phi$, and under the condition that the magnetic flux in the magnetic circuit keeps constant, when the moving charge number Q in the time-varying magductance component is changed, the magductance parameter of the time-varying magductance component accordingly changes to generate magnetomotive force, namely, induced current.

6. The power generation device based on the time-varying magductance principle according to claim 5, wherein the magnetomotive force with the time-varying magductance component meets $$\mathcal{F} = N\frac{dQ}{dt} = \frac{d\Gamma}{dt} = \mathcal{L}(t)\frac{d\Phi(t)}{dt} + \frac{d\mathcal{L}(t)}{dt}\Phi(t).$$

When the magnetic flux of the magnetic circuit keeps constant, but the magductance parameter of the time-varying magductance component changes over the time, namely, $\Phi\neq0$, $d\Phi/dt=0$, $dL/dt\neq0$, and $$\mathcal{F} = \frac{d\mathcal{L}(t)}{dt}\Phi(t),$$

showing that the time-varying magductance component generates magnetomotive force, namely, induced current, due to the variation of magductance parameter with time.

7. The power generation device based on the time-varying magductance principle according to claim 1, wherein the power conversion unit consists of the switching device and the circuit for electric energy transmission.

8. The power generation device based on the time-varying magductance principle according to claim 1, wherein the electric energy storage unit is a supercapacitor or another device suitable for fast charging and energy storage.

9. A power generation method based on the time-varying magductance principle, specifically includes:
   S1: selecting a magnetic circuit with constant magnetic flux or a space with constant magnetic field;
   S2: adding any one power generation device based on the time-varying magductance principle according to claim 1 to the magnetic circuit with constant magnetic flux or the constant magnetic field space, making the magnetic flux of the magnetic circuit link with the time-varying magductance component in the power generation device to form a charge linkage;

S3: changing the charge linkage in the time-varying magductance component, resulting that the magductance parameter changes over the time to generate magnetomotive force, namely, induced current; and S4: outputting the generated induced current to the electric energy storage unit by controlling the power conversion unit in the time-varying magductance power generation device, and provide electric energy for an electromagnetic device.

10. The power generation method based on the time-varying magductance principle according to claim 9, wherein the magnetic flux in the magnetic circuit keeps constant in step S3:

by changing a physical environment for the time-varying magductance component, a charge linkage in the time-varying magductance component changes, resulting that the magductance parameter of the time-varying magductance component correspondingly changes over time to generate magnetomotive force, namely, induced current; and by changing the moving charge number in the time-varying magductance component, the magductance parameter of the time-varying magductance component accordingly changes as well to generate magnetomotive force, namely, induced current.

* * * * *